United States Patent
Pacella et al.

(10) Patent No.: US 11,991,286 B2
(45) Date of Patent: May 21, 2024

(54) SYSTEMS AND METHODS FOR USING A NON-FUNGIBLE DIGITAL ASSET TO FACILITATE ACCESSING AN ACCESS-RESTRICTED RESOURCE

(71) Applicant: Verizon Patent and Licensing Inc., Basking Ridge, NJ (US)

(72) Inventors: Dante J. Pacella, Charles Town, WV (US); Nazneen Khan, Alpharetta, GA (US); Rea Setya, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 31 days.

(21) Appl. No.: 17/405,290

(22) Filed: Aug. 18, 2021

(65) Prior Publication Data
US 2023/0055835 A1 Feb. 23, 2023

(51) Int. Cl.
*H04L 9/32* (2006.01)
*H04L 9/08* (2006.01)
*H04L 9/00* (2022.01)

(52) U.S. Cl.
CPC .......... *H04L 9/3213* (2013.01); *H04L 9/0825* (2013.01); *H04L 9/088* (2013.01); *H04L 9/50* (2022.05); *H04L 2209/603* (2013.01)

(58) Field of Classification Search
CPC ..... H04L 9/3213; H04L 9/0825; H04L 9/088; H04L 9/50; H04L 2209/603
See application file for complete search history.

(56) References Cited

U.S. PATENT DOCUMENTS

| | | | |
|---|---|---|---|
| 8,392,709 B1 * | 3/2013 | Agrawal | H04L 9/3228 |
| | | | 713/169 |
| 11,075,891 B1 * | 7/2021 | Long | G06F 21/10 |
| 11,229,848 B1 * | 1/2022 | Koch | A63F 13/335 |
| 11,605,062 B2 * | 3/2023 | Prakash | G06Q 20/326 |
| 2017/0288867 A1 * | 10/2017 | Collier | G06F 21/602 |
| 2019/0190724 A1 * | 6/2019 | Sundaresan | H04L 9/3271 |
| 2021/0133700 A1 * | 5/2021 | Williams | G06Q 20/3678 |
| 2022/0222364 A1 * | 7/2022 | Roberts | G06F 21/64 |
| 2023/0009908 A1 * | 1/2023 | Castinado | H04L 9/0819 |

OTHER PUBLICATIONS

Gupta et al., "Smart Ticket System", Technical Disclosure Commons, Aug. 4, 2021 (Year: 2021).*

* cited by examiner

*Primary Examiner* — Henry Tsang (57) ABSTRACT

An exemplary method includes an access management system receiving a signed message that is associated with a non-fungible digital asset and that includes a non-fungible digital asset identifier and a nonce. The non-fungible digital asset may be configured to provide access to an access-restricted resource. Based on the non-fungible digital asset identifier included in the signed message, the access management system may access a distributed record that is configured to store ownership information associated with the non-fungible digital asset. Based on the signed message and the ownership information stored in the distributed record, the access management system may verify that a user of the non-fungible digital asset is authorized to access the access-restricted resource.

17 Claims, 9 Drawing Sheets

SYSTEMS AND METHODS FOR USING A NON-FUNGIBLE DIGITAL ASSET TO FACILITATE ACCESSING AN ACCESS-RESTRICTED RESOURCE

BACKGROUND INFORMATION

Advances in digital asset management have resulted in different types of digital assets that may be owned by users of computer systems. For example, a user of a computing device (e.g., a smartphone, a tablet computer, etc.) may acquire ownership of a non-fungible digital asset (e.g., a digital photograph, digital artwork, a meme, a video clip, an audio clip, etc.). Information associated with such ownership may be recorded in a distributed ledger (e.g., a blockchain) that certifies the non-fungible digital asset as being unique and that provides proof of ownership of the non-fungible digital asset.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Systems and methods for using a non-fungible digital asset to facilitate accessing an access-restricted resource are described herein. For example, an exemplary access management system may determine whether a user of a non-fungible digital asset is authorized to access an access-restricted resource based on a signed message that includes a non-fungible digital asset identifier of the non-fungible digital asset and a nonce.

In certain examples, for instance, an exemplary method may include an access management system receiving a signed message that is associated with a non-fungible digital asset and that includes a non-fungible digital asset identifier and a nonce. The non-fungible digital asset may be configured to provide access to an access-restricted resource. The access management system may further access, based on the non-fungible digital asset identifier included in the signed message, a distributed record that is configured to store ownership information associated with the non-fungible digital asset, and verify, based on the signed message and the ownership information stored in the distributed record, that a user of the non-fungible digital asset is authorized to access the access-restricted resource.

As used herein, an "access-restricted resource" may include any suitable resource to which access may be desirable to limit and/or control. For example, an access-restricted resource may include but is not limited to any suitable content, service, and/or event that may each be subject to a predefined access restriction. Such a predefined access restriction may include requiring that a user own one or more non-fungible digital assets to gain access to the access-restricted resource. In examples where an access-restricted resource corresponds to an event, the event may include, for example, a virtual event (e.g., virtual concert, a virtual red-carpet event, a virtual movie premier, an in-game virtual event, etc.) that may be virtually experienced by a user, a live event (e.g., a music concert, a sporting event, an in-person convention, etc.) that may be physically experienced by a user, and/or any other suitable type of event. In certain examples, a non-fungible digital asset may provide access to a specific location within an event such as a specific seat (e.g., a boxed seat), section, etc. at the event. In examples where an access-restricted resource corresponds to content, the content may include, for example, audio content (e.g., music, podcasts, etc.), video content (e.g., television shows, movies, user generated content, etc.), and/or any other suitable type of content. In examples where an access-restricted resource corresponds to a service, the service may include, for example, an internet provider service, a teleconferencing service, an augmented reality ("AR") rendering service, a data storage service, a gaming service, a shopping service, and/or any other suitable type of service. In certain implementations, an access-restricted resource may correspond to a content distribution network ("CDN") through which a user may access (e.g., stream) media content (e.g., music, movies, television programs, etc.) provided by a media content provider. Examples of access-restricted resources are described further herein.

As used herein, a "non-fungible digital asset" may include any digital asset that is not interchangeable in terms of value and/or content with other digital assets and that may be configured to provide access to an access-restricted resource such as described herein. For example, a non-fungible digital asset may include a digital token, a still image (e.g., a digital trading card, a digital poster, etc.), a digital signature or identifier, augmented reality content, a live photo, an audio file, a video file, and/or any other suitable non-fungible digital asset or combination of non-fungible digital assets. In certain examples, a non-fungible digital asset may be implemented as part of a smart contract that is configured to facilitate accessing an access-restricted resource. In certain examples, a non-fungible digital asset may be unique.

The non-fungibility of a digital asset may be due to any suitable attribute of the digital asset. For example, the non-fungibility of a digital asset may be due to intrinsic attributes of the digital asset that distinguish the digital asset from other digital assets so as to make the digital assets not readily interchangeable with each other. For example, a first live photo of a first person (e.g., a celebrity, an athlete, etc.) may be intrinsically visually different from and thus not readily interchangeable with a second live photo of a second person that is different than the first person.

In certain examples, the non-fungibility of a non-fungible digital asset may be based solely on an identifier (e.g., a token identifier ("ID")) of the non-fungible digital asset. For example, a first non-fungible digital asset may have a first non-fungible digital asset identifier and a second non-fungible digital asset may have a second non-fungible digital asset identifier. The first non-fungible digital asset and the second non-fungible digital asset may be identical in every way except that the first non-fungible digital asset identifier is different than the second non-fungible digital asset identifier.

In certain examples, the non-fungibility of non-fungible digital assets may be further differentiated based on present or past ownership of the non-fungible digital assets. For example, a certain non-fungible digital asset may have previously been owned by a celebrity, which may render that particular non-fungible digital asset relatively more valuable/collectible than other non-fungible digital assets.

In certain examples, a non-fungible digital asset may be unique with a certain number of them being available (e.g., a certain number of invites to the same virtual event may be available). Such non-fungible digital assets may be considered as being part of the same series and may be implemented in any suitable manner.

Non-fungible digital assets such as described herein may include or otherwise be associated with metadata that specifies how a non-fungible digital asset may be configured to facilitate access to one or more access-restricted resources. Such metadata may be represented in any suitable format and may include any suitable information and/or attributes associated with non-fungible digital assets. For example, such metadata may include information specifying one or more access-restricted resources to which a non-fungible digital asset is configured to provide access, attributes of a non-fungible digital asset, parameters associated with use and/or transfer of the non-fungible digital asset, and/or any other suitable information.

Various advantages and benefits are associated with the systems and methods described herein. For example, systems and methods such as those described herein may improve technologies associated with providing access to an access-restricted resource by leveraging distributed ledger technology (e.g., blockchain technology) and non-fungible digital assets (e.g., non-fungible tokens ("NFT")) to facilitate either granting or denying access to the access-restricted resource. In addition, systems and methods such as those described herein may provide a secure way of using a non-fungible digital asset to validate access to an access-restricted resource in a manner that is not susceptible to replay attacks. Further, systems and methods such as those described herein may facilitate sharing and/or transfer of ownership of non-fungible digital assets that may be used to access access-restricted resources. Moreover, systems and methods such as those described herein may facilitate generating analytics information, which may be used to track popularity, ownership, and/or use of digital assets in different market segments. These and other benefits that may be provided by systems and methods described herein will be evident from the disclosure that follows.

Figure 1:
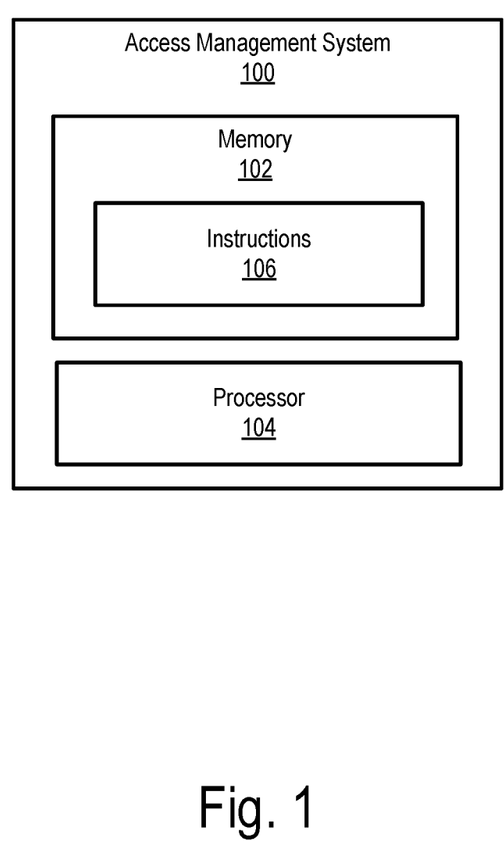
FIG. 1 illustrates an exemplary access management system according to principles described herein.

FIG. 1 illustrates an exemplary access management system 100 ("system 100"). As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. An illustrative implementation of system 100 is described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data representative of sets of digital assets such as non-fungible digital assets, analytical information associated with use of digital assets, information regarding verification of digital assets, ownership conditions of digital assets, metadata associated with digital assets, notifications, graphics, and/or any other suitable data.

Processor 104 may be configured to perform (e.g., execute instructions 106 stored in memory 102 to perform) various processing operations associated with authorizing access to access-restricted resources. For example, processor 104 may verify, based on a signed message and ownership information stored in a distributed record, that a user of a non-fungible digital asset is authorized to access an access-restricted resource. These and other operations that may be performed by processor 104 are described herein.

System 100 (e.g., processor 104) may be configured to provide any suitable service and/or feature that may be associated with digital assets as may serve a particular implementation. For example, system 100 may be configured to generate digital assets, manage ownership transfer of digital assets, facilitate sharing of digital assets, facilitate use of digital assets, and/or provide any other suitable service and/or feature that may facilitate management of one or more digital assets.

System 100 may be configured to generate non-fungible digital assets configured to provide access to an access-restricted resource. This may be accomplished in any suitable manner. For example, system 100 may provide any suitable user interface to facilitate a user indicating which content (e.g., images, videos, audio, etc.) is to be used to generate the non-fungible digital assets and which access-restricted resource the non-fungible digital assets may be used to access. Any suitable protocol (e.g., blockchain protocol) may be used to facilitate generating non-fungible digital assets as may serve a particular implementation. For example, system 100 may use an Ethereum-based NFT standard such as ERC-721 to facilitate generating non-fungible digital assets such as those described herein.

In certain implementations, system 100 may have or retain access to each non-fungible digital asset generated by or used by system 100. In such examples, system 100 may use an object identifier ("objectID") to differentiate each non-fungible digital asset instead of a non-fungible digital asset identifier (e.g., a tokenID) such as described herein.

In certain implementations, system 100 may generate replicas of a non-fungible digital asset to be distributed to users. For example, system 100 may generate N replicas of a non-fungible digital asset to be used to access an access-restricted resource. M replicas of the non-fungible digital asset may be distributed to M users, where M<N. In certain alternative implementations, a non-fungible digital asset and/or one or more replicas of the non-fungible digital asset may be generated by a third party.

Figure 2:
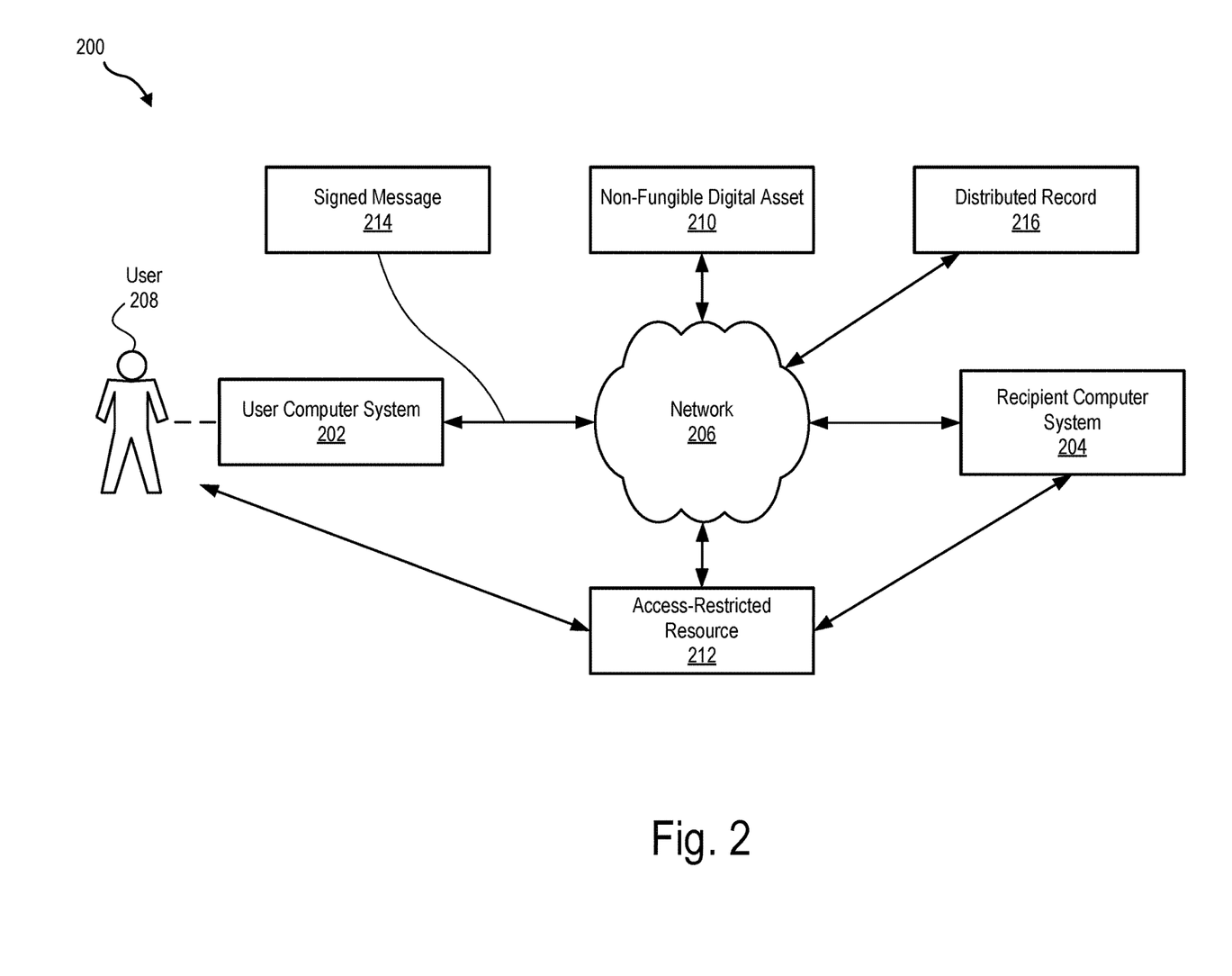
FIG. 2 illustrates an exemplary implementation of the access management system of FIG. 1 according to principles described herein.

System 100 may be implemented in any suitable manner as may serve a particular application. FIG. 2 shows an exemplary implementation 200 in which system 100 may be provided in certain examples. As shown in FIG. 2, implementation 200 includes a user computer system 202 that is communicatively connected to a recipient computer system 204 by way of a network 206. User computer system 202 and recipient computer system 204 may be implemented by any suitable computing device or combination of computing devices as may serve a particular implementation. For example, user computer system 202 and/or recipient computer system 204 may be implemented by desktop computers, laptop computers, smartphones, and/or any other suitable type of computing device. System 100 may be implemented by either user computer system 202 or recipient computer system 204. Alternatively, system 100 may be distributed across user computer system 202, recipient computer system 204, and/or any other suitable computer system.

User computer system 202 and recipient computer system 204 may communicate using any communication platforms and technologies suitable for transporting data and/or communication signals, including known communication technologies, devices, media, and protocols supportive of remote communications, examples of which include, but are not limited to, data transmission media, communications devices, and data transmission protocols.

Network 206 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between user computer system 202 and recipient computer system 204. Communications between user computer system 202 and recipient computer system 204 may be transported using any one of the above-listed networks, or any combination or sub-combination of the above-listed networks. Alternatively, user computer system 202 and recipient computer system 204 may communicate in another way such as by one or more direct connections between user computer system 202 and recipient computer system 204.

User computer system 202 may be owned or operated by a user 208 who may use a non-fungible digital asset 210 to access an access-restricted resource 212, which may correspond to any suitable type of access-restricted resource such as those described herein. In certain examples, user computer system 202 may implement a digital wallet application that may be configured to perform one or more of the operations described herein. For example, such a digital wallet application may store keys (e.g., a public/private key pair) associated with non-fungible digital asset 210, generate a nonce, maintain a list of non-fungible digital assets owned by user 208, and/or perform any other suitable operation(s).

Non-fungible digital asset 210 may correspond to any suitable type of non-fungible digital asset such as those described herein. In certain examples, non-fungible digital asset 210 may be configured to be used to repeatedly access access-restricted resource 212 any suitable number of times. For example, access-restricted resource 212 may correspond to a media content streaming service. In such an example, non-fungible digital asset 210 may be used repeatedly to verify that user 208 is authorized to access the media content streaming service each time user 208 tries to log into the media content streaming service. In certain alternative implementations, non-fungible digital asset 210 may be configured to be used only a single time (or any other defined number of times) to access access-restricted resource 212. For example, access-restricted resource 212 may correspond to a virtual event such as a virtual red-carpet event or a virtual premier of a movie. In such an example, non-fungible digital 210 asset may be used to verify that user 208 is authorized to access to the virtual event and may not be reusable thereafter to access any event. However, in such an example, user 208 may keep non-fungible digital asset 210 as a digital collectable item that is associated with the virtual event and that may be sold or traded in any suitable manner such as described herein.

Non-fungible digital asset 210 may be stored in any suitable manner and at any suitable location as may serve a particular implementation. In certain examples, non-fungible digital asset 210 may be stored remotely from user computer system 202 and may be accessible by user computer system 202 by way of network 206. For example, non-fungible digital asset 210 may be hosted at a server that is remote from user computer system 202. User computer system 202, for example, may implement a digital wallet application that stores keys that are usable to access non-fungible digital asset 210 wherever it is stored. For example, the keys may be used to access non-fungible digital asset 210 at a network address associated with non-fungible digital asset 210 and hosted by the server. Such a server may be implemented as part of user computer system 202, recipient computer system 204, or may be a third-party server that is remote from user computer system 202 and recipient computer system 204. In certain alternative implementations, the keys stored by a digital wallet application may be used to access non-fungible digital asset 210 from a local storage device of user computer system 202.

In certain examples, non-fungible digital asset 210 may include an embedded uniform resource locator ("URL") that may be used to access and/or download the non-fungible digital asset through a CDN.

Recipient computer system 204 may be owned or operated by any suitable entity that may facilitate user 208 accessing access-restricted resource 212. For example, recipient computer system 204 may be used by an entity that may act as a gatekeeper to determine whether user 208 is authorized to access access-restricted resource 212 based on a signed message 214 that is associated with non-fungible digital asset 210.

Figure 3:
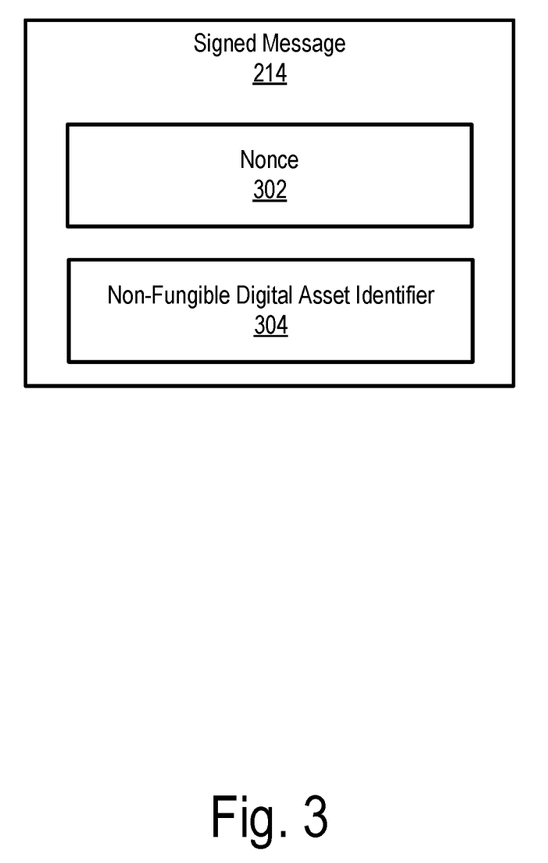
FIG. 3 illustrates an exemplary signed message that may be implemented according to principles described herein.

Signed message 214 may be generated in any suitable manner and may include any suitable information as may serve a particular implementation. For example, an elliptic curve digital signature algorithm ("ECDSA") may be used in certain implementations to generate signed message 214. In certain examples, a digital wallet application implemented by user computer system 202 may be configured to generate signed message 214. FIG. 3 shows exemplary components that may be included as part of signed message 214 in certain implementations. As shown in FIG. 3, signed message 201 may include a nonce 302 and a non-fungible digital asset identifier 304. Signed message 214 may include additional components in certain implementations.

Nonce 302 may be used, for example, to prevent replay attacks from being used to fraudulently access access-restricted resource 212. System 100 (e.g., user computer system 202) may be configured to generate nonce 302 in any suitable manner and provide nonce 302 to be included as part of signed message 214. Nonce 302 may correspond to any suitable arbitrary number that may be used in a cryptographic communication (e.g., for only one signed message). Nonce 302 may be used in any suitable manner by system 100 to encrypt and/or prepare signed message 214 to be validated by recipient computer system 204.

In certain examples, nonce 302 may be a one-time-use nonce. In such examples, system 100 may generate a new nonce each time system 100 generates another signed message. Additionally or alternatively, nonce 302 may be configured to be invalidated after expiration of a predefined amount of time.

Non-fungible digital asset identifier 304 may include any suitable information, characters, etc. that may be used to identify a non-fungible digital asset. In certain examples, non-fungible digital asset identifier 304 may be generated as part of a minting process of non-fungible digital asset 210.

System 100 (e.g., user computer system 202) may use nonce 302 and non-fungible digital asset identifier 304 in any suitable manner to generate signed message 214. For example, system 100 may generate a message that includes nonce 302 and non-fungible digital asset identifier 304. System 100 may then sign the message in any suitable manner using a private key associated with non-fungible digital asset 210 (e.g., a private key of a user that wants to access/use non-fungible digital asset 210) to generate signed message 214. In certain examples, signed message 214 may be a single use signed message. Additionally or alternatively, signed message 214 may be configured to be invalidated after expiration of a predefined amount of time.

Returning to FIG. 2, user computer system 202 may send signed message 214 in any suitable manner (e.g., by way of network 206) to recipient computer system 204. For example, signed message 214 may be sent in the form of a text message, an email, etc. In certain examples, scannable codes (e.g., QR codes) may be used to facilitate sending or otherwise making available signed message 214 to recipient computer system 204. For example, in certain implementations, a scannable code may be provided for display by way of a display screen of user computer system 202 to be scanned by recipient computer system 204 when user 208 requests access to access-restricted resource 212.

Based on non-fungible digital asset identifier 304 stored in signed message 214, system 100 (e.g., recipient computer system 204) may access a distributed record 216 that is configured to store ownership information associated with non-fungible digital asset 210.

Distributed record 216 may correspond to any suitable type of distributed record as may serve a particular implementation. For example, distributed record 216 may correspond to a distributed ledger that is implemented by blockchain in certain examples. Although distributed record 216 is shown as being separate from user computer system 202 and recipient computer system 204, it is understood that a copy of distributed record 216 may be stored in any suitable storage device associated with either user computer system 202, recipient computer system 204, and/or any other suitable computer system. Alternatively, distributed record 216 may be distributed across user computer system 202, recipient computer system 204, and/or any other suitable computer system.

The ownership information stored in distributed record 216 may include any suitable information associated with non-fungible digital asset 210. For example, the ownership information may indicate which user owns non-fungible digital asset 210, which user or users are authorized to access access-restricted resource 212 using non-fungible digital asset 210, and/or any other suitable information.

In certain examples, system 100 may access distributed record 216 by way of a verify-access proxy application programing interface ("API"). Such a verify-access proxy API may be provided in front of distributed record 216 to provide an intermediary between recipient computer system 204 and distributed record 216. In such examples, the verify-access proxy API may be used to throttle the number of verifications performed at a given time to avoid a possible denial of service vector.

Based on signed message 214 and the ownership information, system 100 may verify whether user 208 of non-fungible digital asset 210 is authorized to access access-restricted resource 212. This may be accomplished in any suitable manner. For example, system 100 may compare information included in the signed message 214 with information stored in distributed record 216 to determine whether user 208 is the owner of non-fungible digital asset 210.

If system 100 determines that user 208 is not the owner of non-fungible digital asset 210, system 100 may deny access to access-restricted resource 212. In certain examples, system 100 may provide a notification to user 208 indicating that access to access-restricted resource 212 has been denied. Such a notification may be provided in any suitable manner as may serve a particular implementation. For example, system 100 may provide a notification to user 208 by way of a text notification, an email notification, a banner message, etc. provided by way of user computer system 202.

If system 100 determines that user 208 is the owner of non-fungible digital asset 210, system 100 may facilitate user 208 accessing access-restricted resource 212. This may be accomplished in any suitable manner. For example, system 100 may facilitate user 208 accessing access-restricted resource 212 by way of network 206. To illustrate, in instances where access-restricted resource 212 corresponds to a CDN, system 100 may establish a secure connection by way of network 206 between user computer system 202 and the CDN. Alternatively, system 100 may facilitate user 208 directly accessing access-restricted resource 212 (e.g., not by way of network 206). For example, in instances where access-restricted resource 212 corresponds to an event such as a sporting event, system 100 may unlock, for example, a turnstile or entry gate that provides entry into an arena where the sporting event is being played.

In certain examples, system 100 may be configured to provide a notification indicating that user 208 of non-fungible digital asset 210 is authorized to access access-restricted resource 212. Such a notification may be provided in any suitable manner such as described herein.

In certain examples, one or more of the operations described herein as being performed by system 100 may be implemented by a smart contract configured to operate as part of or in conjunction with non-fungible digital asset 210. Such a smart contract may be configured to automatically execute based on satisfaction of a predefined condition to determine whether user 208 is authorized to access access-restricted resource 212. As used herein, the expression "automatically" means that an operation (e.g., a validation operation) or series of operations are performed without requiring further input from a user. For example, recipient computer system 204 receiving signed message 214 may trigger automatic execution of the smart contract including automatically accessing distributed record 216, automatically determining, based on ownership information in distributed record 216, whether user 208 is authorized to access access-restricted resource 212, and automatically either granting or denying access to access-restricted resource 212 depending on the determination.

Figure 4:
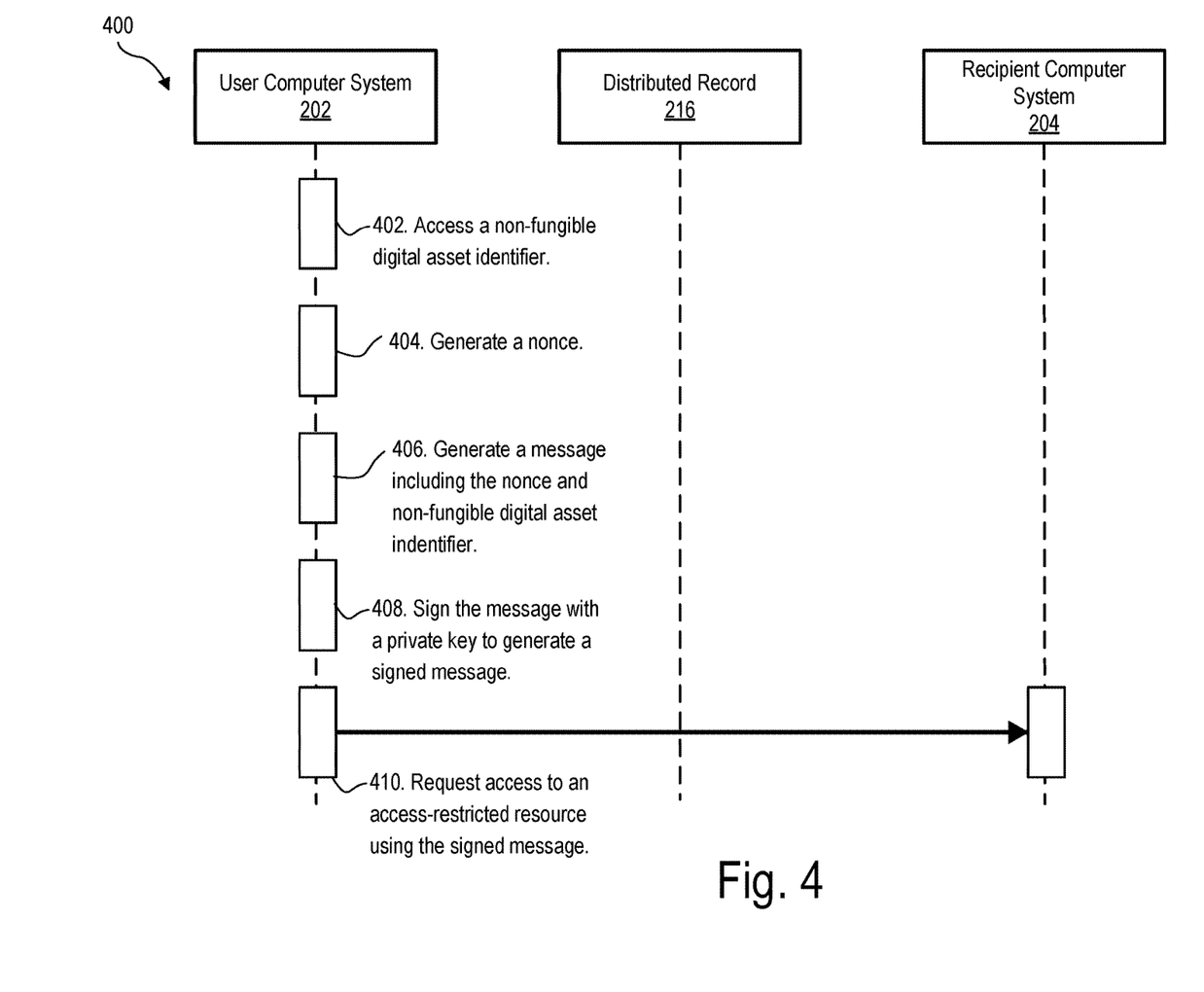
FIGS. 4-5 illustrate exemplary flow charts that may be implemented according to principles described herein.
Figure 5:
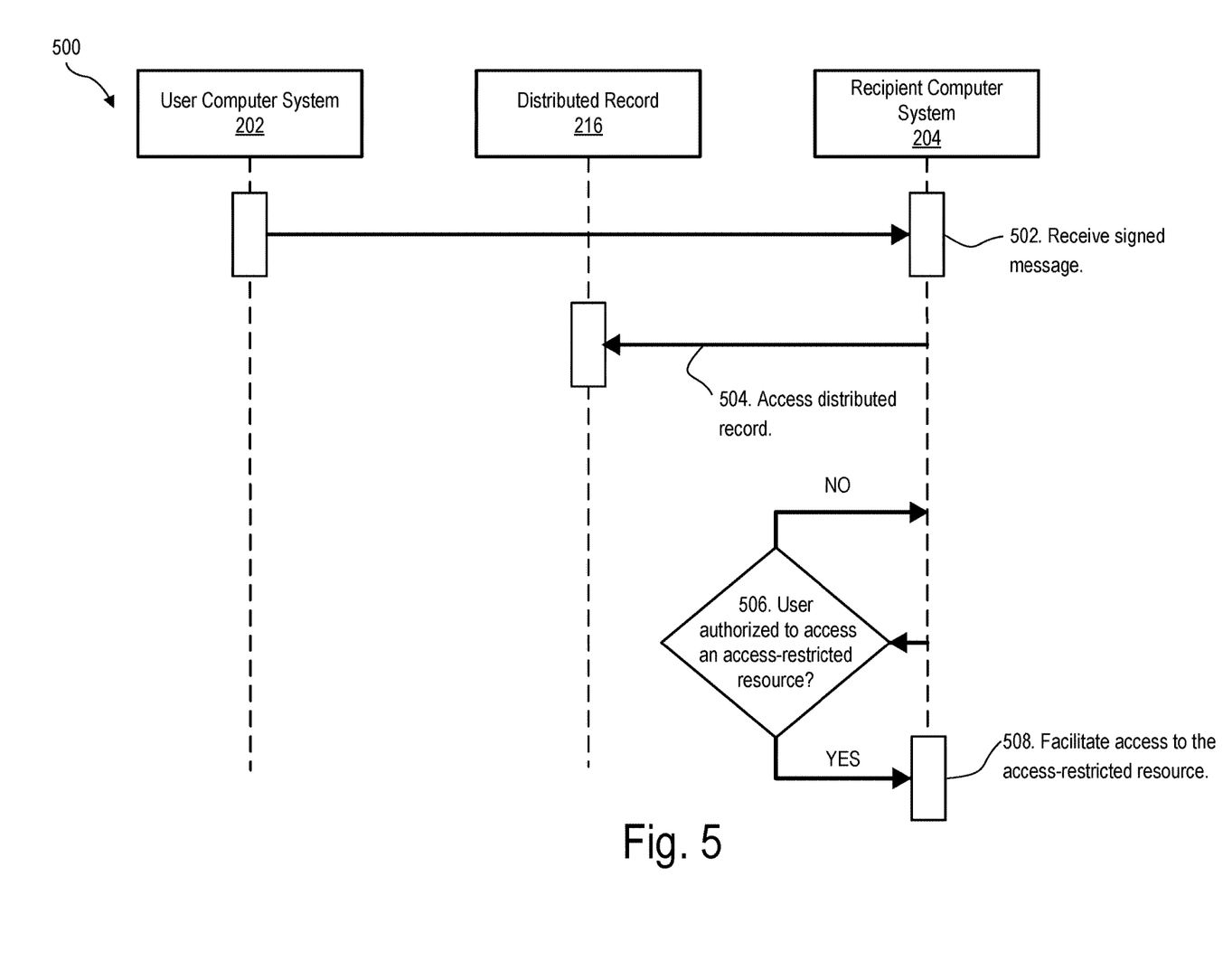

FIGS. 4 and 5 are a flow diagrams 400 and 500 that depict exemplary operations that may be performed by system 100 in certain implementations. As shown in FIG. 4, at operation 402, user computer system 202 may access a non-fungible digital asset identifier associated with a non-fungible digital asset (e.g., non-fungible digital asset 210). For example, a digital wallet application implemented by user computer system 202 may access the non-fungible digital asset identifier from a storage device associated with user computer system 202.

At operation 404, user computer system 202 may generate a nonce. Operation 404 may be performed in any suitable manner such as described herein.

At operation 406, user computer system 202 may generate a message including the nonce and the non-fungible digital asset identifier. Operation 406 may be performed in any suitable manner such as described herein.

At operation 408, user computer system 202 may sign the message with a private key associated with the non-fungible digital asset to generate a signed message. Operation 408 may be performed in any suitable manner.

At operation 410, user computer system 202 may request access to an access-restricted resource using the signed message generated at operation 408. Operation 410 may be performed in any suitable manner such as described herein.

As shown in FIG. 5, at operation 502, recipient computer system 204 may receive the signed message generated at operation 408 shown in FIG. 4. For example, recipient computer system 204 may receive the signed message by way of network 206. Operation 502 may be performed in any suitable alternative manner such as described herein.

At operation 504, recipient computer system 204 may access distributed record 216 to determine whether user 208 of user computer system 202 is authorized to access access-restricted resource 212. Operation 504 may be performed in any suitable manner such as described herein.

At operation 506, recipient computer system 204 may determine whether user 208 is authorized to access access-restricted resource 212. If the answer at operation 506 is "NO," the flow may return to before operation 506 as shown in FIG. 5 or may be terminated in any suitable way.

If the answer at operation 506 is "YES," recipient computer system 204 may facilitate user 208 accessing access-restricted resource 212 at operation 508. Operation 508 may be performed in any suitable manner such as described herein.

In certain examples, access to access-restricted resource 212 may be unlockable based on satisfaction of a predefined ownership condition. In such examples, the predefined ownership condition may include any suitable predefined ownership condition as may serve a particular implementation. For example, a predefined ownership condition may require user 208 to own a threshold number of non-fungible digital assets, may require satisfaction of an interaction requirement (e.g., a time requirement, a volume requirement, a value requirement, a number of social interactions with other users, a transaction requirement, a geolocation visitation requirement, a viewing requirement (e.g., to avoid spoilers), an event requirement (e.g., an outcome of a championship game), etc.), and/or any other suitable predefined ownership condition. For example, non-fungible digital asset 210 may be included in a set of non-fungible digital assets. In such an example, the predefined ownership condition may require that user 208 of non-fungible digital asset 210 own one or more additional non-fungible digital assets included in the set of non-fungible digital assets prior to being allowed to access access-restricted resource 212. System 100 may verify that user 208 is authorized to access access-restricted resource 212 when it is verified that user 208 owns the one or more additional non-fungible digital assets included in the set of non-fungible digital assets.

To illustrate an example, non-fungible digital asset 210 may be configured to conditionally grant access to a backstage event at a live concert based on a predefined ownership condition. In such an example, the predefined ownership condition may require user 208 to own additional non-fungible digital assets included in a set or series of non-fungible digital assets associated with a band performing at the live concert. For example, user 208 may be required to own non-fungible digital assets representative of each of the albums of the band. In such an example, user 208 may be required to collect non-fungible digital asset 208 that is configured to conditionally grant access and the additional non-fungible digital assets representative of the albums prior to unlocking access to the backstage event.

In certain examples, system 100 may facilitate an owner of a non-fungible digital asset such as described herein sharing access to an access-restricted resource with a third party. In such examples, system 100 may implement a share function as an ownership function associated with a non-fungible digital asset. Such a share function may specify one or more use restrictions associated with the shared use of the non-fungible digital asset to access an access-restricted resource. For example, such use restrictions may include, but are not limited to, time restrictions for using a non-fungible digital asset to access the access-restricted resource, ownership transfer restrictions, and/or any other suitable use restriction. With a share function, there may be a main owner of the non-fungible digital asset and one or more partial owners that have restricted ownership. The share function may beneficially permit the main owner to share access to an access-restricted resource with one or more partial owners without having to worry that the one or more partial owners will transfer the non-fungible digital asset to a third party.

To illustrate an example in which a share function may be implemented, access-restricted resource 212 may correspond to a virtual art gallery. User 208 may access the virtual NFT art gallery using non-fungible digital asset 210 in any suitable manner, such as described herein. However, user 208 may want to share access to the virtual NFT art gallery with one or more friends and/or family. In such an example, the share function may facilitate system 100 providing restricted sharing use of non-fungible digital asset 210 to access the virtual NFT art gallery with the one or more friends and/or family of user 208 according to operations similar to those described herein. Accordingly, user 208 may be able to selectively share partial ownership/use of non-fungible digital asset 210 with the one or more friends and/or family subject to certain restrictions such as a time restriction. A user account of user 208 may then receive full ownership of and exclusive use of non-fungible digital asset 210 to access the virtual NFT art gallery back after, for example, a predefined time period expires.

In certain examples, a share function may facilitate a third party having restricted access to access-restricted resource 212 for the purpose of modifying or augmenting access-restricted resource 212 and/or non-fungible digital asset 210. For example, through the share function, an entity (e.g., a celebrity, an athlete, etc.) may be granted access to access-restricted resource 212 for the purpose of providing an autograph with respect to access-restricted resource 212 and/or non-fungible digital asset 210. The entity may be provided with access to access-restricted resource 212 in any suitable manner such as described herein. As soon as the autograph is provided or a predefined time period expires, the entity may lose access to access-restricted resource 212. In such an example, the entity may be able to observe how the autograph looks with respect to access-restricted resource 212 and/or non-fungible digital asset 210 prior to losing access to access-restricted resource 212.

In certain examples, a creator of access-restricted resource 212 may retain access rights to access-restricted resource 212 even after ownership of non-fungible digital asset 210 is transferred to another user (e.g., user 208). In such examples, non-fungible digital asset identifier 304 and/or any other suitable identifier associated with access-restricted resource 212 may be mapped in any suitable manner to the creator in distributed record 216. Such a mapping may identify the creator as an additional party (e.g., other than the current owner) that is authorized to access access-restricted resource 212. The creator may gain access to access-restricted resource 212 in any suitable manner such as described herein (e.g., through the use of a signed message, a nonce, a non-fungible digital asset identifier, etc.). The creator may retain access rights to access-restricted resource 212 for any suitable amount of time. For example, the creator may retain access rights to access-restricted resource 212 in perpetuity in certain examples. Alternatively, the creator may retain access rights to access-restricted resource 212 only until expiration of a predefined amount of time.

In certain examples, a creator retaining access rights to access-restricted resource 212 may facilitate modifying or augmenting access-restricted resource 212 and/or non-fungible digital asset 210. For example, the creator may share access to access-restricted resource 212 to facilitate an entity such as a celebrity or an athlete providing an autograph with respect to access-restricted resource 212 and/or non-fungible digital asset 210.

In certain examples, system 100 may facilitate transferring ownership of non-fungible digital assets between users. This may be accomplished in any suitable manner. For example, user 208 may sell, trade, or otherwise transfer, in any suitable manner, non-fungible digital asset 210 to another user. In response, system 100 may record, in distributed record 216, updated ownership information indicating that ownership of non-fungible digital asset 210 has transferred from user 208 to the other user. The updated ownership information may include any suitable information regarding current and past ownership of non-fungible digital asset 210. Such a transfer of ownership may result in the new owner gaining all of the access rights associated with access-restricted resource 212 and user 208 no longer having access to access-restricted resource 212.

In certain examples, non-fungible digital asset 210 may be subject to one or more transfer restrictions that govern transferability of non-fungible digital asset 210 from an owner of non-fungible digital asset 210 to another user. Such transfer restrictions may include, for example, limiting when user 208 may sell non-fungible digital asset 210, limiting a minimum and/or maximum amount of money that user 208 may obtain by selling non-fungible digital asset 210, and/or any other suitable transfer restriction.

In certain examples, system 100 may collect analytics information associated with use of digital assets. Such analytics information may include anonymous data from digital asset transactions performed according to principles described herein. The analytics information may be used in any suitable manner as may serve a particular implementation. For example, the collected analytics information may be used to provide advertisements to users, evaluate the effectiveness of promotional items, track popularity of digital assets, evaluate sponsorships, and/or for any other suitable purpose.

Figure 6:
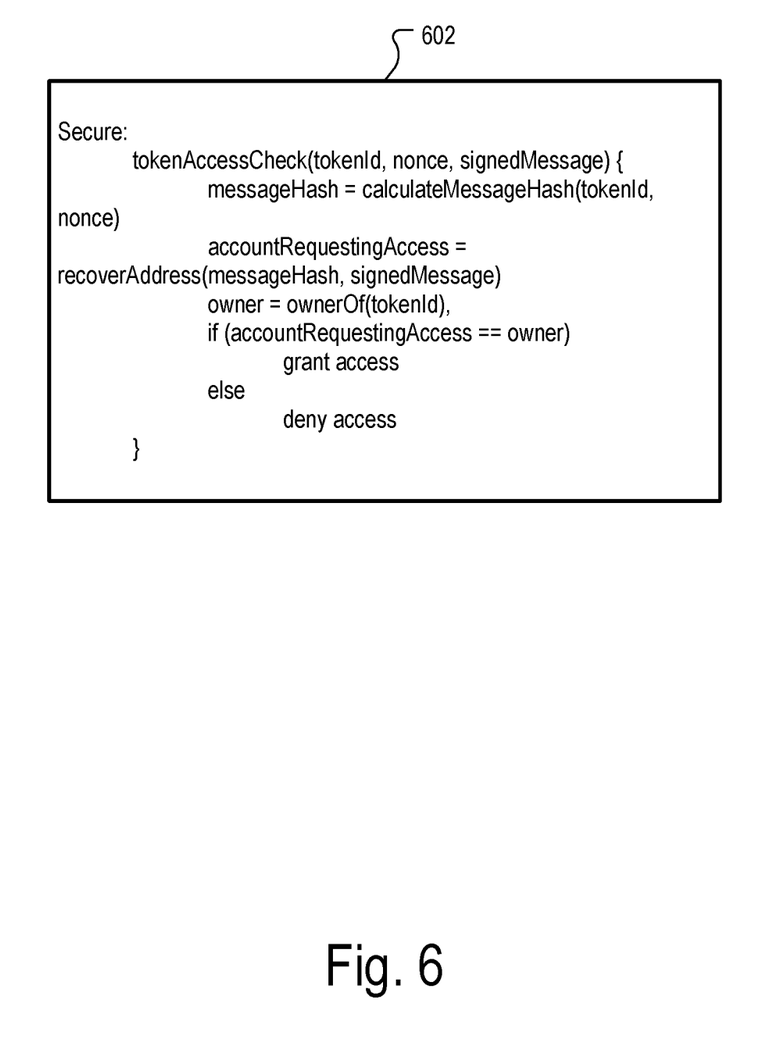
FIG. 6 illustrates an exemplary implementation of code that may be used to facilitate providing access to an access-restricted resource according to principles described herein.

FIG. 6 illustrates an exemplary implementation 602 of code that may be used by system 100 to facilitate determining whether to grant or deny access to an access-restricted resource. As shown in FIG. 6, the code may define a secure "tokenAccessCheck" in which a "tokenId," a "nonce," and a "signedMessage" are used to verify ownership of a non-fungible digital asset. In the example shown in FIG. 6, a "messageHash" may be calculated using the "token Id" and the "nonce". As shown in FIG. 6, access is either granted or denied based on whether an "accountRequestingAccess" is determined to be the owner of the "token Id."

Figure 7:
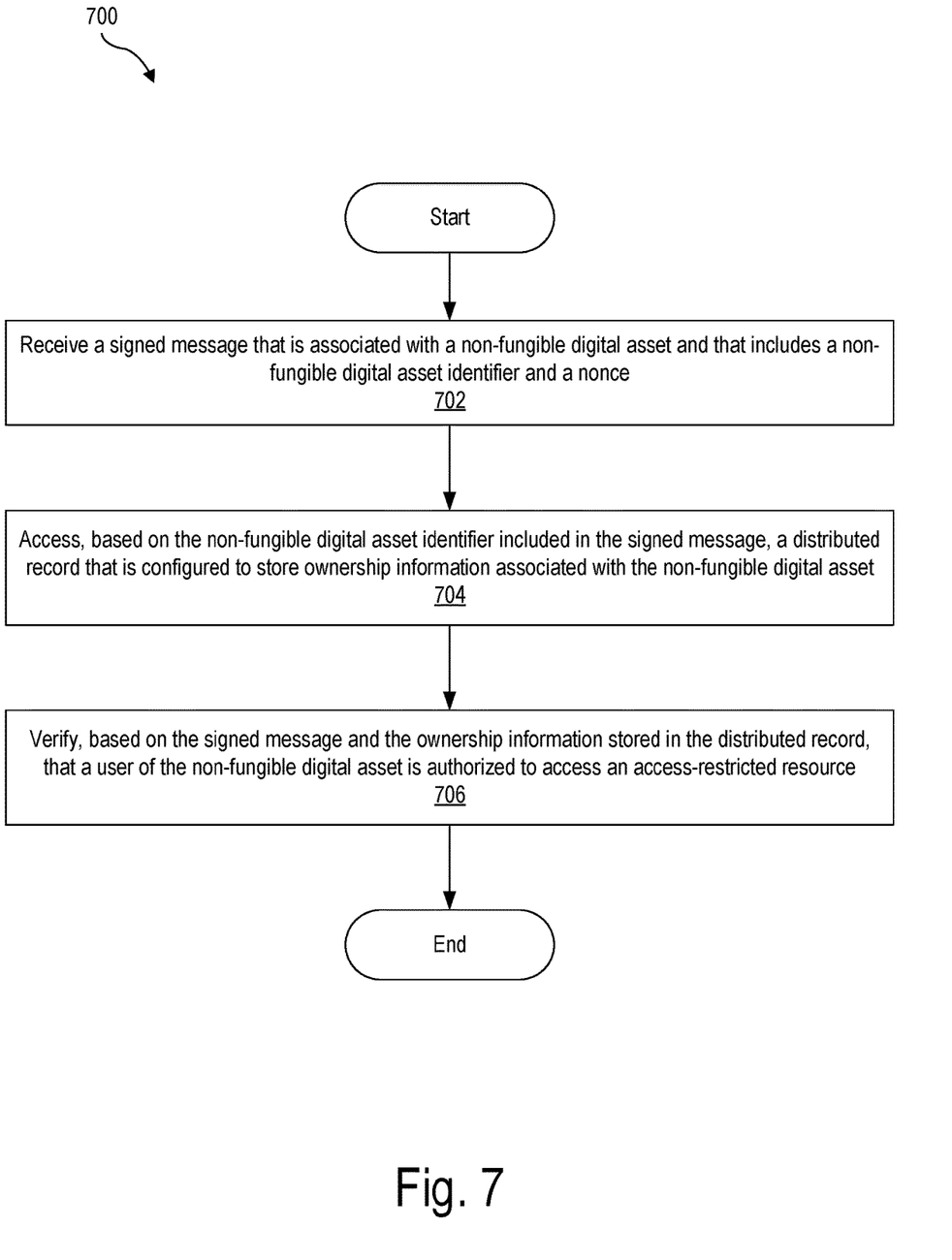
FIGS. 7-8 illustrate exemplary methods according to principles described herein.

FIG. 7 illustrates an exemplary method 700 for using a non-fungible digital asset to facilitate accessing an access-restricted resource. While FIG. 7 illustrates exemplary operations according to one embodiment, other embodiments may omit, add to, reorder, and/or modify any of the operations shown in FIG. 7. One or more of the operations shown in FIG. 7 may be performed by system 100, any components included therein, and/or any implementation thereof.

At operation 702, an access management system (e.g., access management system 100) may receive a signed message that is associated with a non-fungible digital asset and that includes a non-fungible digital asset identifier and a nonce. The non-fungible digital asset may be configured to provide access to an access-restricted resource. Operation 702 may be performed in any of the ways described herein.

At operation 704, the access management system may access, based on the non-fungible digital asset identifier included in the signed message, a distributed record that is configured to store ownership information associated with the non-fungible digital asset. Operation 704 may be performed in any of the ways described herein.

At operation 706, the access management system may verify, based on the signed message and the ownership information stored in the distributed record, that a user of the non-fungible digital asset is authorized to access the access-restricted resource. Operation 706 may be performed in any of the ways described herein.

Figure 8:
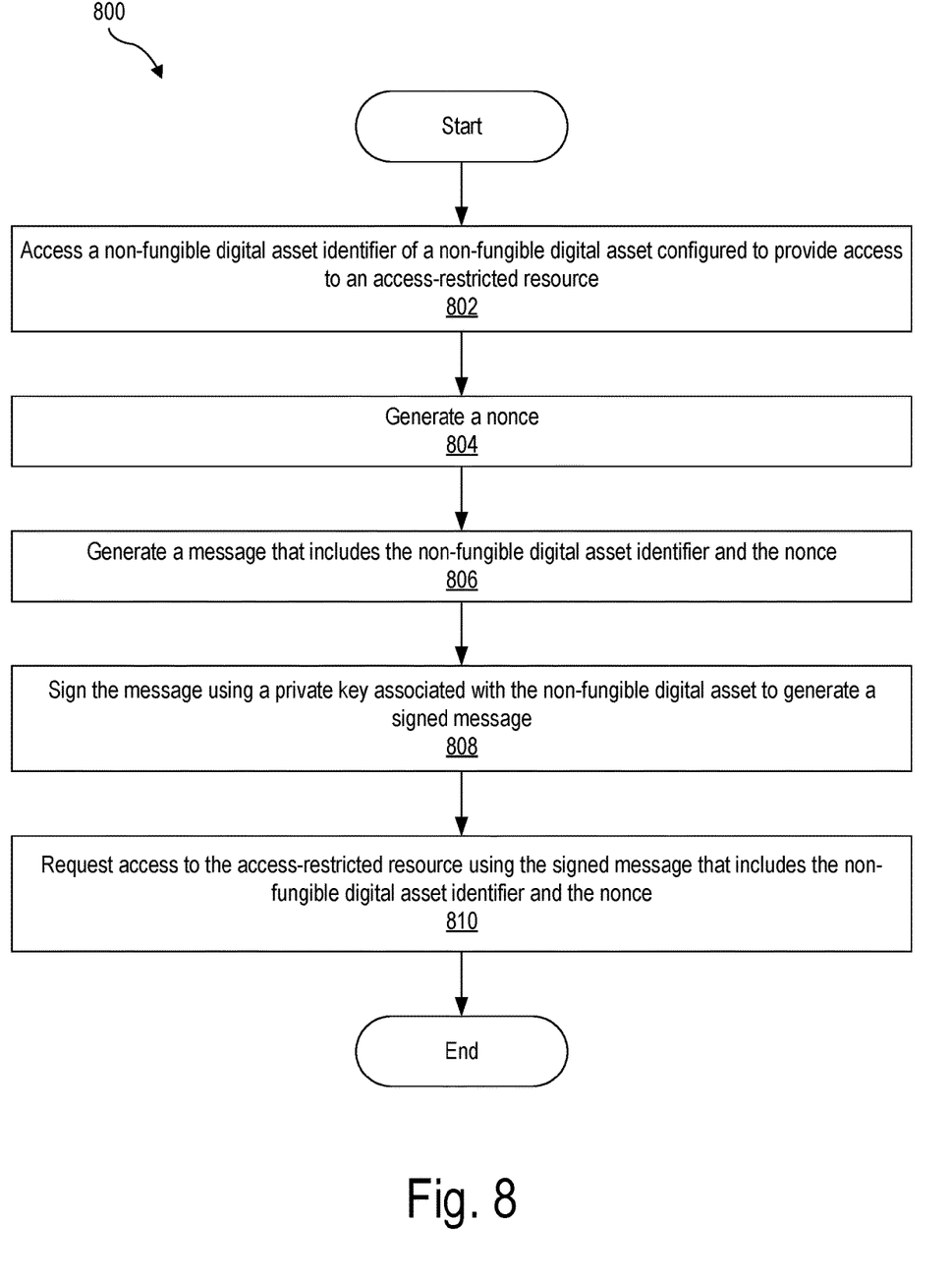

FIG. 8 illustrates another exemplary method 800 for using a non-fungible digital asset to facilitate accessing an access-restricted resource. While FIG. 8 illustrates an exemplary operation according to one embodiment, other embodiments may add to and/or modify the operation shown in FIG. 8. The operation shown in FIG. 8 may be performed by system 100, any components included therein, and/or any implementation thereof.

At operation 802, an access management system (e.g., access management system 100) may access a non-fungible digital asset identifier of a non-fungible digital asset configured to provide access to an access-restricted resource. Operation 802 may be performed in any of the ways described herein.

At operation 804, the access management system may generate a nonce. Operation 804 may be performed in any of the ways described herein.

At operation 806, the access management system may generate a message that includes the non-fungible digital asset identifier and the nonce. Operation 806 may be performed in any of the ways described herein.

At operation 808, the access management system may sign the message using a private key associated with the non-fungible digital asset to generate a signed message. Operation 808 may be performed in any of the ways described herein.

At operation 810, the access management system may request access to the access-restricted resource using the signed message that includes the non-fungible digital asset identifier and the nonce. Operation 810 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 9:
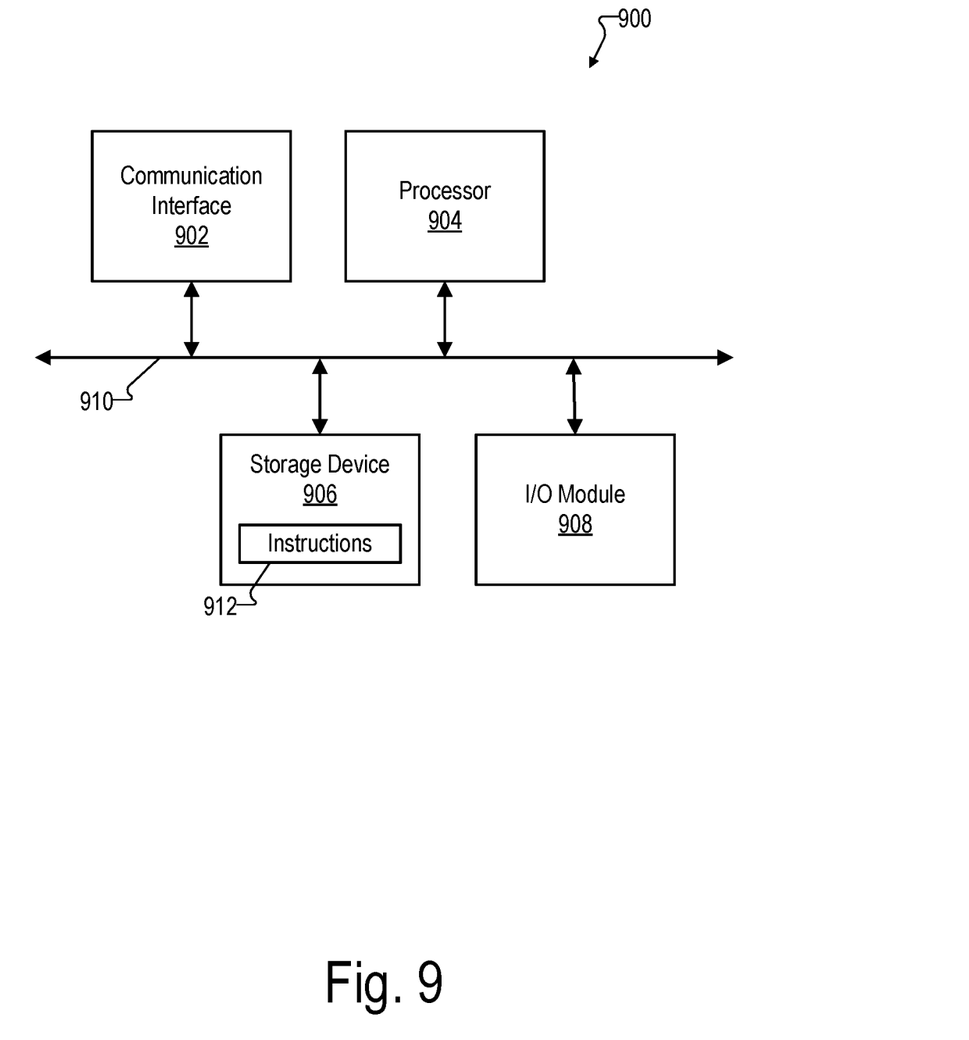
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output (I/O) module 908 communicatively connected one to another via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 900. For example, memory 102 may be implemented by storage device 906, and processor 104 may be implemented by processor 904.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by an access management system, a signed message that is associated with a non-fungible digital asset and that includes a non-fungible digital asset identifier and a nonce, the non-fungible digital asset configured to provide access to an access-restricted resource;
   accessing, by the access management system and based on the non-fungible digital asset identifier included in the signed message, a distributed record that is configured to store ownership information associated with the non-fungible digital asset;
   verifying, by the access management system and based on the signed message and the ownership information stored in the distributed record, that a user of the non-fungible digital asset is authorized to access the access-restricted resource;
   granting, by the access management system and based on an input provided by the user, partial ownership of the non-fungible digital asset to a third party, the partial ownership recorded in the ownership information in the distributed record and granting the third party access to a virtual non-fungible digital asset art gallery using the non-fungible digital asset;
   determining, by the access management system after the granting of the partial ownership to the third party, that a predefined condition is satisfied; and granting, by the access management system and based on the determining that the predefined condition is satisfied, full ownership of the non-fungible digital asset back to the user.

2. The method of claim 1, further comprising facilitating, by the access management system and based on the verifying, the user of the non-fungible digital asset accessing the access-restricted resource.

3. The method of claim 1, wherein the signed message is generated using a private key associated with the non-fungible digital asset.

4. The method of claim 1, wherein the nonce is a one-time-use nonce.

5. The method of claim 1, wherein the signed message is configured to be invalidated after expiration of a predefined amount of time.

6. The method of claim 1, wherein the non-fungible digital asset is subject to one or more transfer restrictions that govern transferability of the non-fungible digital asset from an owner of the non-fungible digital asset to another user.

7. The method of claim 1, wherein the non-fungible digital asset includes metadata that specifies the access-restricted resource to which the non-fungible digital asset is configured to provide access.

8. The method of claim 1, wherein the accessing of the distributed record includes accessing the distributed record by way of a verify-access proxy application programing interface.

9. A method comprising:
   accessing, by an access management system, a non-fungible digital asset identifier of a non-fungible digital asset configured to provide access to an access-restricted resource;
   generating, by the access management system, a nonce;
   generating, by the access management system, a message that includes the non-fungible digital asset identifier and the nonce;
   signing, by the access management system, the message using a private key associated with the non-fungible digital asset to generate a signed message;
   requesting, by the access management system, access to the access-restricted resource using the signed message that includes the non-fungible digital asset identifier and the nonce;
   granting, by the access management system and based on an input provided by a user of the non-fungible digital asset, partial ownership of the non-fungible digital asset to a third party, the partial ownership recorded in ownership information in a distributed record and granting the third party access to a virtual non-fungible digital asset art gallery using the non-fungible digital asset;
   determining, by the access management system after the granting of the partial ownership to the third party, that a predefined condition is satisfied; and
   granting, by the access management system and based on the determining that the predefined condition is satisfied, full ownership of the non-fungible digital asset back to the user.

10. The method of claim 9, further comprising receiving, by the access management system and in response to the requesting of the access to the access-restricted resource, a notification indicating that the user of the non-fungible digital asset is authorized to access the access-restricted resource.

11. The method of claim 9, wherein the nonce is a one-time-use nonce.

12. The method of claim 9, wherein the signed message is configured to be invalidated after expiration of a predefined amount of time.

13. The method of claim 9, wherein:
   the non-fungible digital asset is currently owned by the user; and
   the method further comprises:
      receiving, by the access management system, a request to transfer ownership of the non-fungible digital asset from the user to an additional user; and
      recording, by the access management system and in a distributed record that is configured to store ownership information associated with the non-fungible digital asset, that the ownership of the non-fungible digital asset has transferred from the user to the additional user.

14. A system comprising:
   a memory that stores instructions; and
   a processor communicatively coupled to the memory and configured to execute the instructions to:
      receive a signed message that is associated with a non-fungible digital asset and that includes a non-fungible digital asset identifier and a nonce, the non-fungible digital asset configured to provide access to an access-restricted resource;
      access, based on the non-fungible digital asset identifier included in the signed message, a distributed record that is configured to store ownership information associated with the non-fungible digital asset;
      verify, based on the signed message and the ownership information stored in the distributed record, that a user of the non-fungible digital asset is authorized to access the access-restricted resource;
      grant, based on an input provided by the user, partial ownership of the non-fungible digital asset to a third party, the partial ownership recorded in the ownership information in the distributed record and granting the third party access to a virtual non-fungible digital asset art gallery using the non-fungible digital asset;
      determine, after the granting of the partial ownership to the third party, that a predefined condition is satisfied; and
      grant, based on the determining that the predefined condition is satisfied, full ownership of the non-fungible digital asset back to the user.

15. The system of claim 14, wherein the processor is further configured to execute the instructions to facilitate, based on the verifying, the user of the non-fungible digital asset accessing the access-restricted resource.

16. The system of claim 14, wherein the access-restricted resource is unlockable based on satisfaction of a predefined ownership condition.

17. The system of claim 16, wherein:
   the non-fungible digital asset is included in a set of non-fungible digital assets;
   the predefined ownership condition requires that the user of the non-fungible digital asset owns one or more additional non-fungible assets included in the set of non-fungible digital assets to unlock the access-restricted resource; and
   the verifying that the user is authorized to access the access-restricted resource includes verifying that the user owns the one or more additional non-fungible assets included in the set of non-fungible digital assets.

\* \* \* \* \*